United States Patent
Oh

(10) Patent No.: US 7,970,409 B2
(45) Date of Patent: Jun. 28, 2011

(54) WIRELESS COMMUNICATION SYSTEM, TERMINAL DEVICE AND BASE STATION FOR WIRELESS COMMUNICATION SYSTEM, AND CHANNEL SCHEDULING METHOD THEREOF

(75) Inventor: Jang Geun Oh, Suwon (KR)

(73) Assignee: LG Electronics Inc., Seoul (KR)

( * ) Notice: Subject to any disclaimer, the term of this patent is extended or adjusted under 35 U.S.C. 154(b) by 848 days.

(21) Appl. No.: 11/779,174

(22) Filed: Jul. 17, 2007

(65) Prior Publication Data
US 2008/0188222 A1 Aug. 7, 2008

(30) Foreign Application Priority Data
Feb. 6, 2007 (KR) .................. 10-2007-0012279

(51) Int. Cl.
*H04W 72/00* (2009.01)
(52) U.S. Cl. ........ 455/450; 455/436; 455/437; 455/438; 455/439; 455/440; 455/441; 455/442; 455/452.2; 455/453
(58) Field of Classification Search .......... 455/436–442, 455/450, 452.2, 453
See application file for complete search history.

(56) References Cited

U.S. PATENT DOCUMENTS

| 6,141,353 | A | * | 10/2000 | Li | 370/465 |
| 6,898,438 | B1 | * | 5/2005 | Uchida | 455/522 |
| 6,970,445 | B2 | * | 11/2005 | O'Neill et al. | 370/338 |
| 7,203,463 | B2 | * | 4/2007 | Bahl et al. | 455/68 |
| 7,564,814 | B2 | * | 7/2009 | Abraham et al. | 370/329 |
| 7,653,386 | B2 | * | 1/2010 | Bennett | 455/422.1 |
| 2003/0013451 | A1 | * | 1/2003 | Walton | 455/447 |
| 2003/0125037 | A1 | * | 7/2003 | Bae et al. | 455/450 |
| 2004/0087331 | A1 | * | 5/2004 | Hwang et al. | 455/522 |
| 2004/0153270 | A1 | * | 8/2004 | Yamashita et al. | 702/81 |
| 2005/0143083 | A1 | * | 6/2005 | Kwon et al. | 455/452.1 |

FOREIGN PATENT DOCUMENTS

KR 10-2004-0110044 A 12/2004

\* cited by examiner

*Primary Examiner* — Patrick N Edouard
*Assistant Examiner* — Shantell Heiber
(74) *Attorney, Agent, or Firm* — Birch, Stewart, Kolasch & Birch, LLP

(57) ABSTRACT

The present invention relates to a method of setting a traffic stream of a wireless communication considering terminal state information. The present invention provides a wireless communication system, comprising a base station for controlling a wireless communication and a terminal device connected to the base station to transmit and receive data, wherein the terminal device transmits terminal state information representing a state thereof to the base station and the base station sets data transmission mode using the received terminal state information. According to the present invention, there is an advantage in that a traffic stream can be maintained considering a state of the terminal, and thus, power consumption of the terminal can be minimized.

22 Claims, 10 Drawing Sheets

EDCA channel access method

EDCA channel access method

Contention between ACs in station

EDCA TXOP bursting

- TS setup -

- OF STA element: State information of STA element -

Structure of HCF super frame containing contention free period and contention period -- Data frame --

Fig. 9

| Action field value | Meaning |
|---|---|
| 0 | ADDTS Request |
| 1 | ADDTS Request |
| 2 | DELTS |
| 3 | Schedule frame |
| 4–255 | Reserved |

– Qos Action field value –

| Order | Information |
|---|---|
| 1 | Category |
| 2 | Action |
| 3 | Schedule |
| 4 | TSPEC |

– Schedule frame body –

Polled TXOP operating mechanism

- TS deletion -

WIRELESS COMMUNICATION SYSTEM, TERMINAL DEVICE AND BASE STATION FOR WIRELESS COMMUNICATION SYSTEM, AND CHANNEL SCHEDULING METHOD THEREOF

This Nonprovisional application claims priority under 35 U.S.C. §119(a) on Patent Application No(s). 10-2007-0012279 filed in Republic of Korea on Feb. 6, 2007, the entire contents of which are hereby incorporated by reference.

BACKGROUND OF THE INVENTION

1. Field of the Invention

The present invention relates to a method of setting a traffic stream of a wireless communication considering terminal state information.

2. Description of the Related Art

Wireless local area networks (LAN) are widely used in a variety of wireless user environments such as home networks, enterprise wireless networks and hot spots. A legacy commercial wireless LAN is an extension of the Ethernet, which provides only best effort services based on IEEE 802.11b standardized in 1999. However, wireless LAN users desire faultless transfer of multimedia streams without losing transmission data. Particularly, even in a wireless LAN environment, superior quality of service (QoS) is indispensable to new applications such as video or multimedia streaming.

Continuous desires of users for bandwidth expansion cause increased congestion and decreased relative transmission speed of the entire wireless network. Accordingly, a network manager comes to need a new mechanism to guarantee services of applications that require strict QoS even in a network with high congestion. Such requirements result in the development of a further enhanced media access control (MAC) protocol than in the conventional LAN.

802.11 MAC defines a mandatory function of distributed coordination function (DCF) and an optional function of point coordination function (PCF). That is, a transmission medium can operate both in contention mode of DCF and in contention free mode of PCF. DCF is an asynchronous transmission method, which provides a basic medium access method of 802.11 MAC and has been implemented in all kinds of commercial wireless LAN products. In terms of wireless medium access, DCF does not consider priorities between stations (terminals, hereinafter referred to as 'STA') at all. Such a characteristic of DCF does not reflect transmission of various types of data traffic, and thus cannot support QoS requested by users in the end.

A synchronous transmission method is a medium access method based on a polling mechanism, which is implemented through PCF. In PCF, a function of a point coordinator (PC) is placed at a central base station, and the base station directly controls all services provided to STAs in a centralized polling scheme. That is, the base station periodically polls connected STAs to give an opportunity to transmit frames to the STAs.

Legacy 802.11 MAC has many problems in supporting wireless LAN QoS. The DCF, i.e. a mandatory function of 802.11 MAC, does not provide any function of supporting QoS. Accordingly, when a DCF method is used, all data traffics are serviced in order of arriving at a transmission queue and processed in best effort mode.

Contrary to the DCF, PCF of 802.11 MAC has been developed to support real-time traffic services but currently supports QoS. However, the PCF has the following problems.

That is, in PCF, the PC placed at the base station defines a scheduling algorithm for the purpose of polling simply based on a round-robin method. However, there are practically various types of traffics that require differentiated QoS, and thus, the round-robin algorithm that cannot assign a priority to traffic is insufficient for supporting QoS.

Further, there is a problem in that if the size of a super frame is small, alternations between a contention period and a contention free period can lead to a considerable overhead.

Further, in legacy MAC, transmission of beacon frames or a starting point of a super frame can be changed. The PC prepares a beacon frame that should be transmitted after a target beacon transmission time (TBTT), and then transmits the beacon frame if the medium is idle as long as a point inter-frame space (PIFS). However, even though STAs cannot complete transmission of frames before a subsequent TBTT, they even can start to transmit frames. Therefore, there is another problem in that the transmission of beacon frame can be delayed.

The delay of beacon frame which should be transmitted immediately after the TBTT delays the transmission of time-constraint frames which should be transmitted within the contention free period. Such a problem causes time delay that is difficult to estimate in a contention free period and thus has a serious influence on QoS.

SUMMARY OF THE INVENTION

Therefore, the present invention is conceived to solve the aforementioned problems in the prior art. Accordingly, an object of the present invention is to provide a wireless communication system and method for setting traffic stream (TS) using state information of a terminal device when scheduling TS to enhance quality of service of a wireless communication.

Another object of the present invention is to provide a wireless communication system and method for setting a traffic stream wherein varying terminal state information is continuously provided to a base station to allow optimal TS setting to be maintained.

A further object of the present invention is to provide a wireless communication system and method for setting a traffic stream wherein optimal TS is set according to a terminal state to allow power consumption of the terminal to be minimized.

According to an aspect of the present invention for achieving the objects, there is provided a wireless communication system which comprises a base station for controlling a wireless communication and a terminal device connected to the base station to transmit and receive data, wherein the terminal device transmits terminal state information representing a state thereof to the base station and the base station sets data transmission mode using the received terminal state information.

At this time, the terminal state information may include any one or more of remaining battery capacity information, central processing unit (CPU) load information and temperature information of the terminal device.

Further, each of the remaining battery capacity information, the CPU load information and the temperature information may be divided into four groups each of which is expressed as 2-bit data.

The base station may set the data transmission mode according to the transmitted terminal state information in such a manner that as the remaining battery capacity increases and the CPU load and temperature decrease, a service interval becomes shorter and a data transmission rate becomes higher.

In addition, the data transmission mode may be set by differently setting a data transmission time period according to the terminal state information.

Here, the terminal device may repeatedly transmit the time-varying terminal state information to the base station in a periodic or non-periodic manner.

Further, if it is determined from the received terminal state information that the data transmission mode needs to be re-set, the base station may delete existing data transmission mode and transmit data in data transmission mode re-set based on the received terminal state information.

According to another aspect of the present invention, there is provided a wireless communication system which comprises a base station for controlling a wireless communication and a terminal device connected to the base station to transmit and receive data, wherein the terminal device updates terminal state information representing a state thereof in a periodic or non-periodic manner and transmits the updated terminal state information to the base station, and the base station updates a data transmission schedule using the transmitted terminal state information and transmits data according to the updated schedule.

According to a further aspect of the present invention, there is provided a wireless communication terminal device configured to transmit state information of the terminal device to a base station and receive data according to data transmission mode scheduled by the base station.

According to a still further aspect of the present invention, there is provided a wireless communication base station configured to receive terminal state information transmitted from a terminal device, set data transmission mode using the terminal state information and transmit or receive data according to the set data transmission mode.

According to a still further aspect of the present invention, there is provided a wireless communication system in a wireless communication of a hybrid coordinated channel access (HCCA) method of IEEE 802.11e standard, which comprises a base station for controlling the wireless communication and a terminal device for communicating with the base station, wherein the terminal device transmits terminal state information representing a state of the terminal device to the base station and the base station sets a traffic stream using the transmitted terminal state information.

At this time, the terminal state information may include any one or more of remaining battery capacity information, central processing unit (CPU) load information and temperature information of the terminal device; and the base station may set the traffic stream according to the transmitted terminal state information in such a manner that as the remaining battery capacity increases and the CPU load and temperature decrease, a service interval becomes shorter and a data transmission rate becomes higher.

The terminal device may transmit the terminal state information through a traffic specification (TSPEC) that includes the terminal state information.

At this time, a terminal state information area may be included in a traffic stream information area (TS info) of the TSPEC.

Further, the terminal device may transmit an ADDTS.request frame containing the TSPEC to the base station, and the base station may transmit setting results of the traffic stream according to the received TSPEC to the terminal device through an ADDTS.response frame.

The base station may set the traffic stream by setting a transmission opportunity (TXOP) corresponding to the terminal state information.

Further, the terminal device may repeatedly transmit the terminal state information to the base station through a DATA frame in a periodic or non-periodic manner.

A header area of the DATA frame may have a terminal state information area for storing the terminal state information.

Meanwhile, the terminal device may repeatedly transmit the terminal state information to the base station through a terminal state response frame in a periodic manner.

Alternatively, the base station may transmit a terminal state request frame to receive the terminal state information, and the terminal device may transmit a terminal state response frame to the base station in response to the terminal state request frame to transmit the terminal state information.

Further, if it is determined from the received terminal state that the traffic stream needs to be re-set, the base station may delete an existing traffic stream by transmitting a DELTS.request frame to the terminal device.

Then, the base station may transmit a schedule frame containing a TSPEC to the terminal device to set a new traffic stream.

In addition, the schedule frame may be contained in a QoS action field.

According to a still further aspect of the present invention, there is provided a wireless communication system in a wireless communication of a HCCA method of IEEE 802.11e standard, which comprises a base station for performing a function of a hybrid coordinator (HC) and a terminal device for communicating with the base station, wherein the terminal device updates terminal state information representing a state of the terminal device and transmits the updated terminal state information to the base station in a periodic or non-periodic manner, and the base station updates a traffic stream using the transmitted terminal state information.

According to a still further aspect of the present invention, there is provided a wireless communication terminal device in a wireless communication of a HCCA method of IEEE 802.11e standard, which is configured to create TSPEC containing terminal state information and transmit the created TSPEC to a base station and to receive data according to a traffic stream, set by the base station, to which the TSPEC is reflected.

According to a still further aspect of the present invention, there is provided a wireless communication base station in a wireless communication of a HCCA method of IEEE 802.11e standard, which is configured to receive TSPEC containing terminal state information from a terminal device, to set a traffic stream to which the TSPEC is reflected, and to transmit data according to the traffic stream.

According to a still further aspect of the present invention, there is provided a method of providing a traffic stream of a wireless communication system, which comprises the steps of (I) transmitting, by a terminal device, terminal state information thereof to a base station; (II) setting, by the base state, data transmission mode using the received terminal state information; and (III) transmitting data in the set data transmission mode.

At this time, the terminal state information may include any one or more of remaining battery capacity information representing remaining battery capacity, CPU load information representing CPU load of the terminal, and temperature information representing temperature of the terminal.

Further, the data transmission mode may be set in such a manner that as the remaining battery capacity increases and the CPU load and temperature decrease, a service interval becomes shorter and a data transmission rate becomes higher.

According to a still further aspect of the present invention, there is provided a method of providing a traffic stream of a wireless communication system in a wireless communication of a HCCA method of IEEE 802.11e standard, which comprises the steps of (A) creating, by a terminal device, TSPEC containing terminal state information thereof; (B) transmitting an ADDTS.request frame containing the created TSPEC to a base station; (C) scheduling, by the base station, the traffic stream using the received TSPEC; (D) transmitting scheduling results to the terminal device through an ADDTS.response frame; and (E) transmitting data through the set traffic stream.

At this time, step (C) may be accomplished by setting a TXOP value.

Further, the terminal state information may include any one or more of remaining battery capacity information representing remaining battery capacity, CPU load information representing CPU load of the terminal, and temperature information representing temperature of the terminal.

In addition, the terminal state information may be stored in a TS information area (TS info) of a TSPEC frame.

Then, the traffic stream may be scheduled in such a manner that as the remaining battery capacity increases and the CPU load and temperature decrease, a service interval becomes shorter and a data transmission rate becomes higher.

The method of providing a traffic stream of a wireless communication system according to the present invention may further comprise the steps of (F) constructing a DATA frame containing the TSPEC; (G) transmitting the DATA frame to the base station; (H) checking the terminal state information contained in the received TSPEC and then determining whether it is necessary to set a new traffic stream; and (I) if it is determined that it is necessary to set a new traffic stream, updating a traffic stream in consideration of the received TSPEC and setting the new traffic stream by transmitting the updated traffic stream to the terminal device.

At this time, the DATA frame may include a terminal state information area in a header area to store the terminal state information.

Then, step (H) may be performed by comparing whether a TXOP value set according to existing terminal state information is the same as a TXOP value set according to new terminal state information.

Alternatively, the method of providing a traffic stream of a wireless communication system according to the present invention may further comprise the steps of (F') constructing a terminal state information frame containing the TSPEC; (G') transmitting the terminal state information frame to the base station; (H') determining whether it is necessary to set a new traffic stream according to the received terminal state information frame; and (I') if it is determined that it is necessary to set a new traffic stream, updating a traffic stream in consideration of the received TSPEC and setting a new traffic stream by transmitting the updated traffic stream to the terminal device.

Here, the terminal state information frame may be transmitted periodically.

Then, the base station may transmit a terminal state request frame requesting transmission of the terminal state information frame to the terminal, and the terminal may transmit the terminal state information frame in response to the terminal state request frame.

Then, the TS may be updated by transmitting a schedule frame containing a new TSPEC to the terminal.

In addition, the schedule frame may be contained in a QoS action field.

At this time, the TS may be updated by the steps of transmitting a DELTS.request frame to the terminal to inform that existing TS has been deleted; transmitting an ADDTS.request frame containing the new TSPEC to the base station; and transmitting scheduling results, onto which the new TSPEC is reflected, to the terminal device through an ADDTS.response frame.

According to a still further aspect of the present invention, there is provided a method of scheduling channels of a wireless communication terminal, which comprises the steps of transmitting a channel scheduling request message; receiving a response message to a channel scheduling request; transmitting terminal state information of the terminal device to a base station periodically or in response to a request of the base station; receiving channel scheduling mode updated by the base station according to the terminal state information; and receiving data according to the updated channel scheduling mode.

According to a still further aspect of the present invention, there is provided a method of scheduling channels of a wireless communication base station, which comprises the steps of (i) receiving a channel scheduling request message from a terminal; (ii) transmitting a response message to a channel scheduling request; (iii) receiving terminal state information of the terminal device from the terminal; (iv) updating channel scheduling mode according to the terminal state information and then transmitting the updated channel scheduling mode to the terminal; and (v) transmitting data according to the updated channel scheduling mode.

At this time, step (iii) may comprise the steps of transmitting a request message requesting the terminal state information to the terminal, and receiving the terminal state information in response to the request message.

According to a still further aspect of the present invention, there is provided a method of scheduling wireless communication channels, which comprises the steps of (a) transmitting, by a terminal, a channel scheduling request message to a base station; (b) transmitting, by the base station, a response message to the terminal in response to the channel scheduling request message; (c) transmitting, by the terminal, terminal state information thereof to the base station; (d) updating, by the base station, channel scheduling mode according to the terminal state information and transmitting the updated channel scheduling mode to the terminal; and (e) transmitting and receiving data according to the updated channel scheduling mode.

At this time, step (c) may comprise the steps of transmitting, by the base station, a request message requesting the terminal state information to the terminal, and transmitting, by the terminal, the terminal state information to the base station in response to the request message.

According to the present invention so configured, there are advantages in that a traffic stream can be kept at an optimal state, and thus, power consumption of a terminal device can also be minimized.

BRIEF DESCRIPTION OF THE DRAWINGS

FIG. 9 is a view showing structures of a QoS action field and a schedule frame according to a preferred embodiment of the present invention.

DETAILED DESCRIPTION OF THE INVENTION

In the present invention, state information of a terminal device is included in a parameter that is used to guarantee QoS of a wireless communication. The present invention is not limited to the contents of the IEEE 802.11e standard. However, as a preferred embodiment of the present invention, an example that is applied in a wireless communication conforming to the IEEE 802.11e standard will be described for convenience of explanation.

In addition, setting of a channel schedule described herein is a concept corresponding to setting of a traffic stream (TS) of IEEE 802.11e, and traffic specification information is a concept corresponding to TSPEC of IEEE 802.11e standard. Further, a base station is a concept corresponding to an AP.

Hereinafter, a preferred embodiment of a wireless communication system, a terminal device and a base station for the wireless communication system, and a method of providing a traffic stream according to the present invention will be described in detail with reference to the accompanying drawings.

Figure 1:
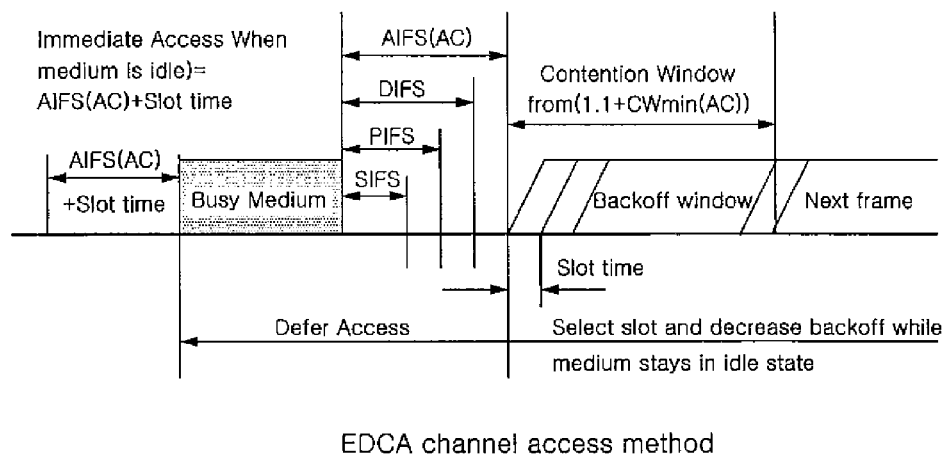
FIG. 1 is a schematic view illustrating an EDCA channel access method.
Figure 2:
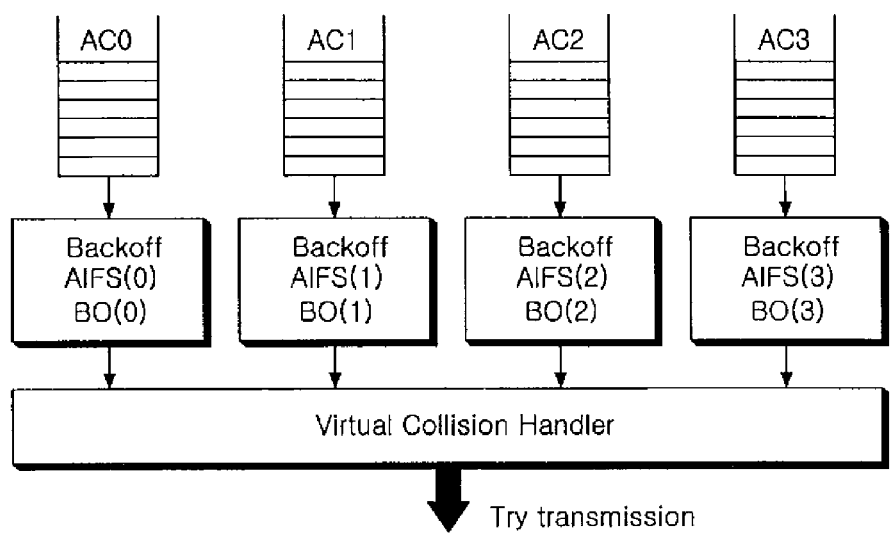
FIG. 2 is a schematic view illustrating a contention state between access categories (AC) within a station in the EDCA method.
Figure 3:
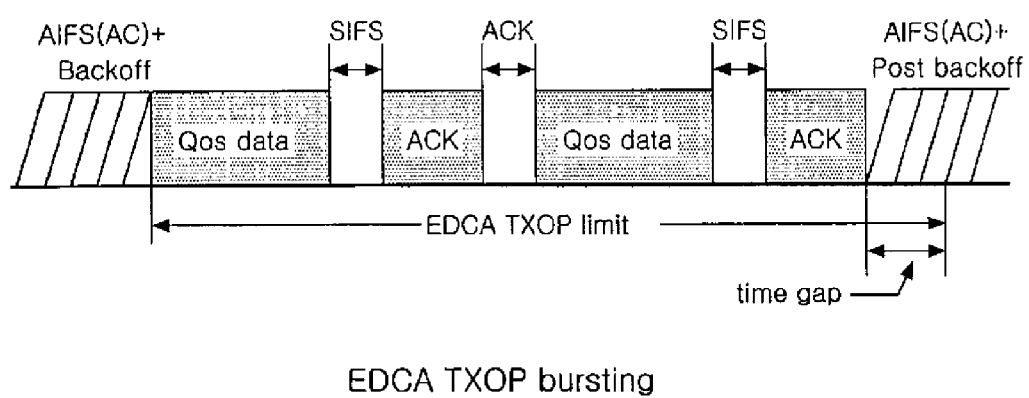
FIG. 3 is a schematic view illustrating EDCA TXOP bursting.
Figure 4:
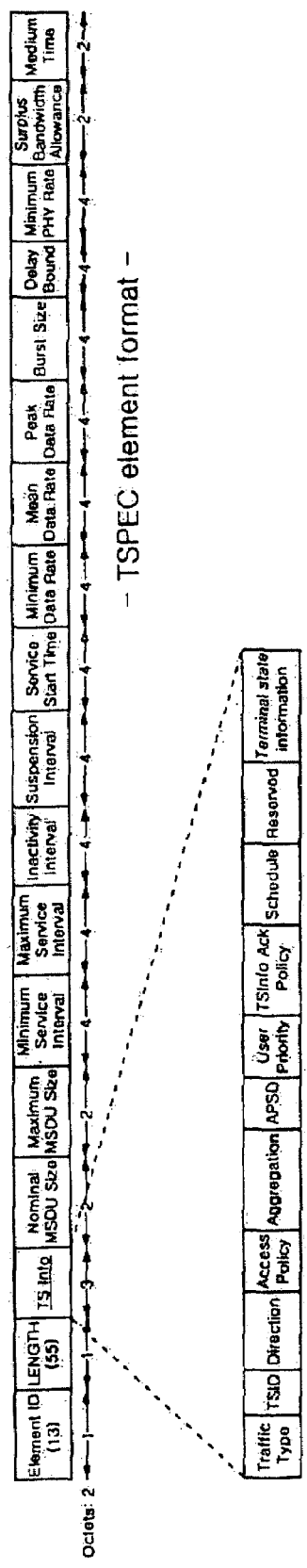
FIG. 4 is a view showing a data structure of TSPEC according to a preferred embodiment of the present invention.
Figure 5:
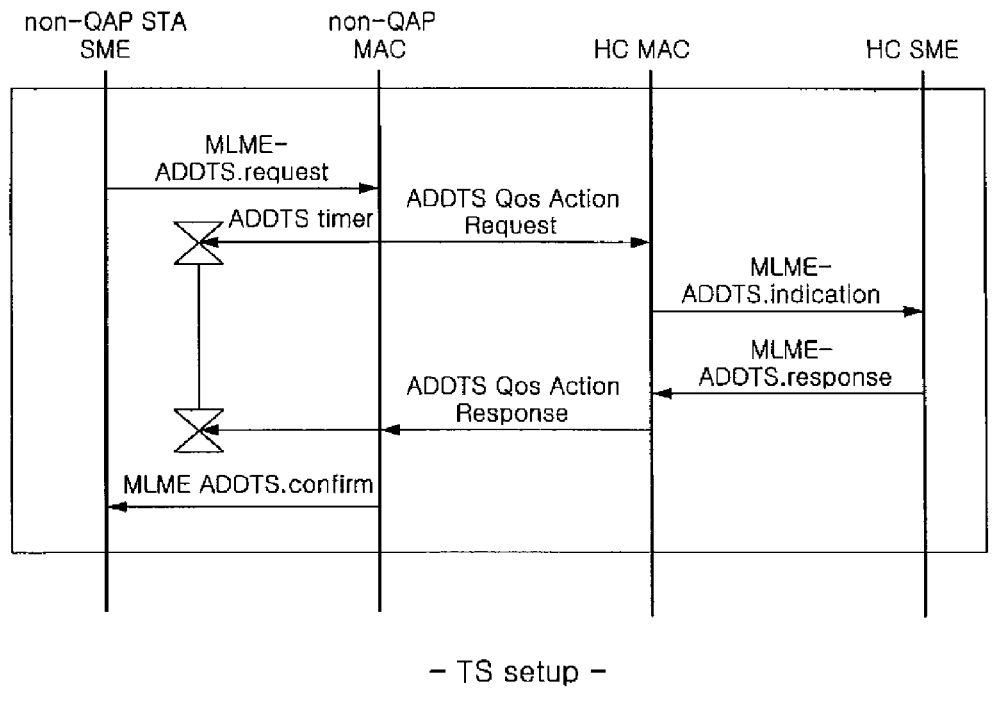
FIG. 5 is a schematic view illustrating a sequence of setting TS according to a preferred embodiment of the present invention.
Figure 6:
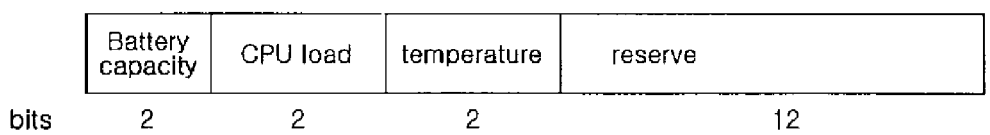
FIG. 6 is a view showing a data structure of terminal state information according to a preferred embodiment of the present invention.
Figure 7:
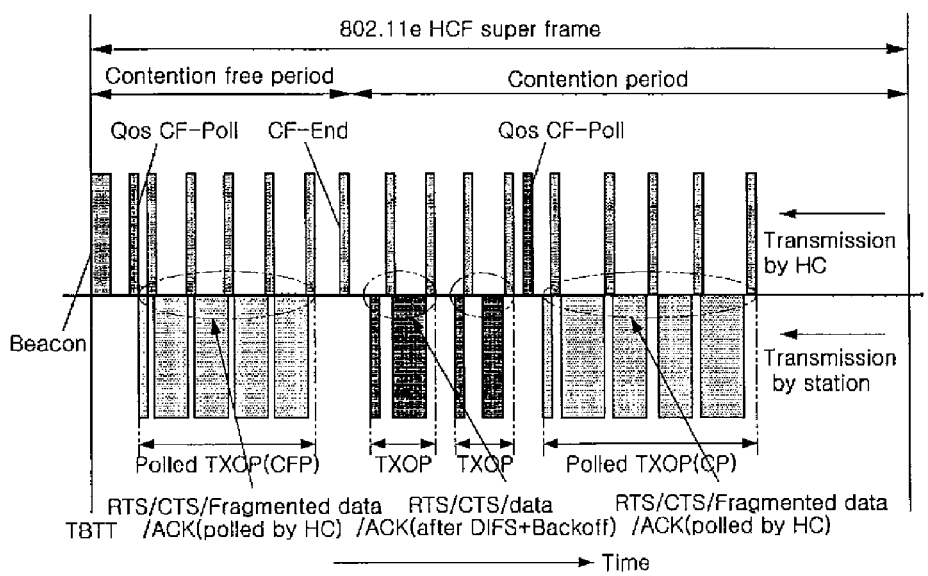
FIG. 7 is a schematic view illustrating a HCF super frame structure comprising a contention period and a contention free period.
Figure 8:
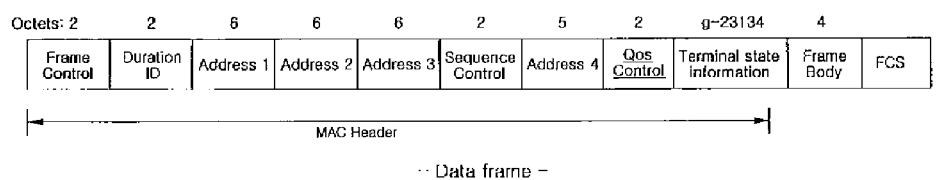
FIG. 8 is a view showing a DATA frame structure according to a preferred embodiment of the present invention.
Figure 10:
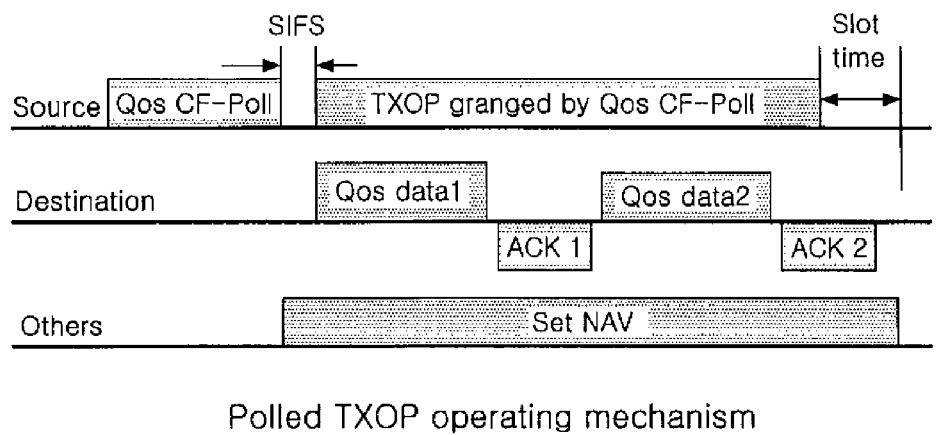
FIG. 10 is a schematic view illustrating an operating mechanism of polled TXOP according to a preferred of the present invention.
Figure 11:
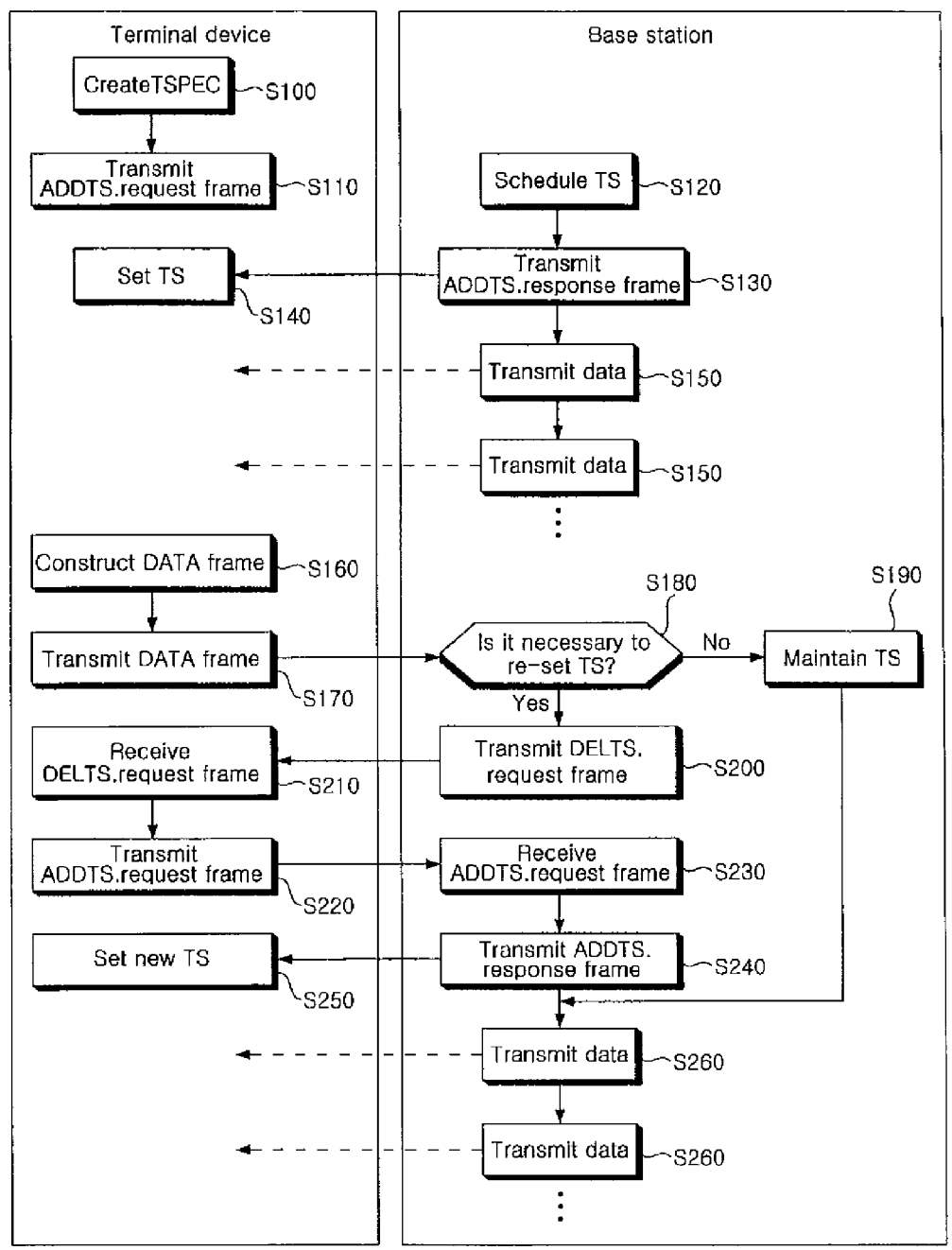
FIG. 11 is a flowchart illustrating a method of setting and re-setting TS according to a preferred embodiment of the present invention.
Figure 12:
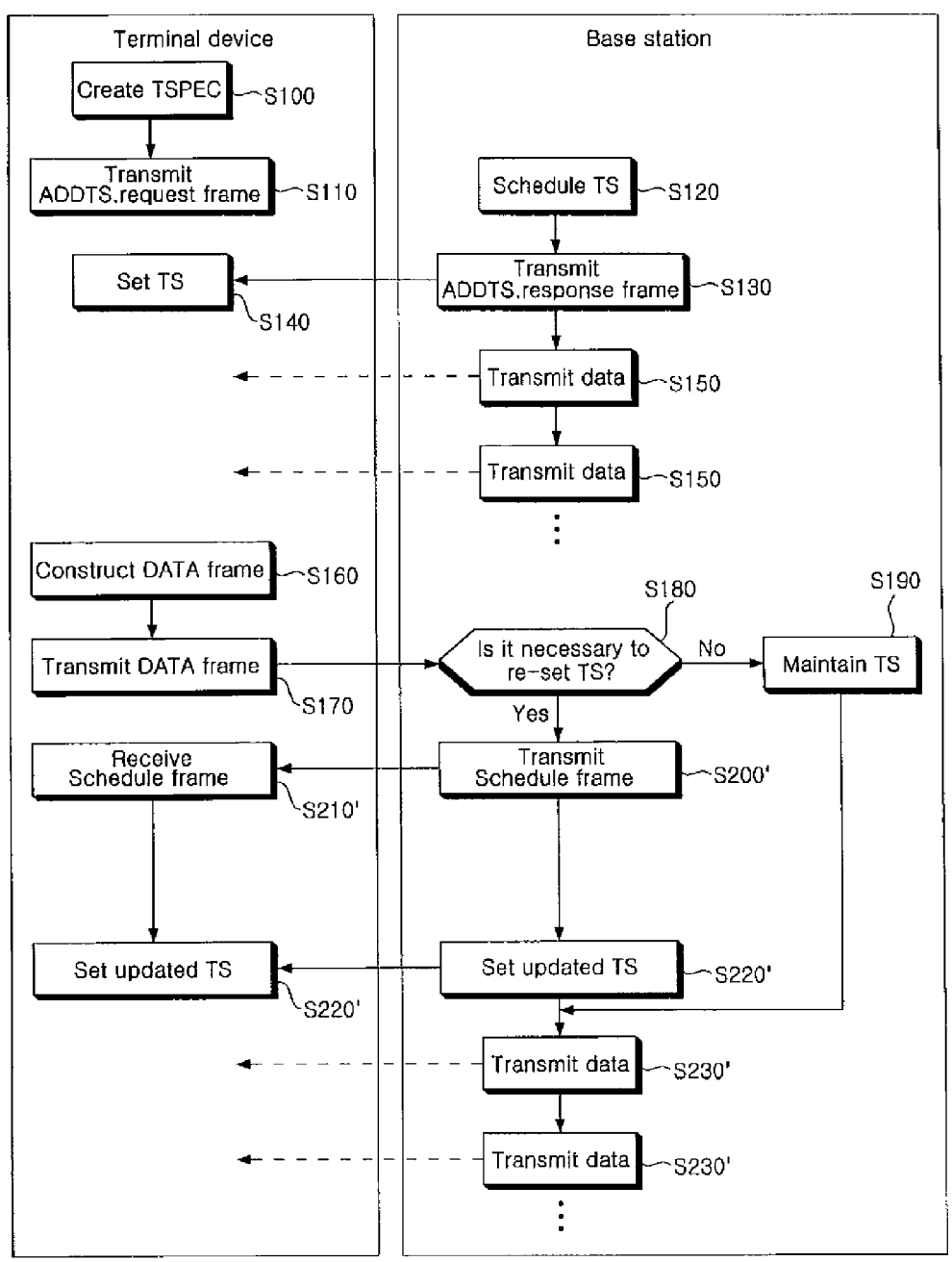
FIG. 12 is a flowchart illustrating a method of setting and re-setting TS according to another preferred embodiment of the present invention.
Figure 13:
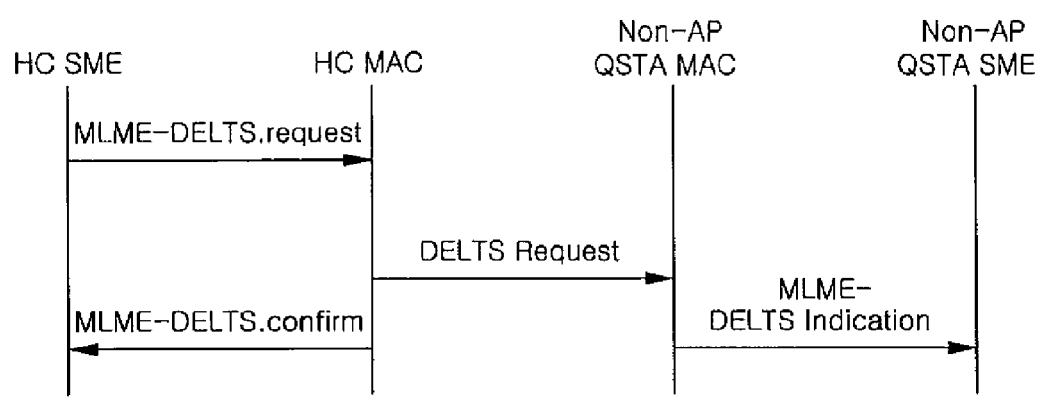
FIG. 13 is a schematic view showing a method of deleting TS according to a preferred embodiment of the present invention.

FIG. 1 is a schematic view illustrating an EDCA channel access method, FIG. 2 is a schematic view illustrating a contention state between access categories (AC) within a station in the EDCA method, FIG. 3 is a schematic view illustrating EDCA TXOP bursting, FIG. 4 is a view showing a data structure of TSPEC according to a preferred embodiment of the present invention, FIG. 5 is a schematic view illustrating a sequence of setting TS according to a preferred embodiment of the present invention, FIG. 6 is a view showing a data structure of terminal state information according to a preferred embodiment of the present invention, FIG. 7 is a schematic view illustrating a HCF super frame structure comprising a contention period and a contention free period, FIG. 8 is a view showing a DATA frame structure according to a preferred embodiment of the present invention, FIG. 9 is a view showing structures of a QoS action field and a schedule frame according to a preferred embodiment of the present invention, FIG. 10 is a schematic view illustrating an operating mechanism of polled TXOP according to a preferred of the present invention, FIG. 11 is a flowchart illustrating a method of setting and re-setting TS according to a preferred embodiment of the present invention, FIG. 12 is a flowchart illustrating a method of setting and re-setting TS according to another preferred embodiment of the present invention, and FIG. 13 is a schematic view showing a method of deleting TS according to a preferred embodiment of the present invention.

To provide further advanced QoS in a wireless LAN, 802.11e MAC that has complemented legacy 802.11 MAC is provided.

IEEE 802.11e defines EDCA and HCCA that can support QoS at an MAC layer of a wireless LAN on the basis of the DCF transmission method of 802.11 MAC to provide a new wireless LAN MAC protocol that can transmit traffic sensitive to transmission delay in addition to the best effort service. 802.11e defines hybrid coordination function (HCF) based on DCF and PCF of the legacy 802.11 MAC protocol. HCF includes a new medium access mechanism for improving QoS of a wireless LAN and can transmit QoS data in both a contention period and a contention free period. Hereinafter, QoS STA (QSTA: QoS station) defined in 802.11e refers to a station which supports QoS, and QoS AP (QAP) refers to a base station which supports QoS.

At this time, the base station is generally an access point (AP), and the base station is an HC which sets a traffic stream. Hereinafter, therefore, the AP is a specific example of the base station.

The HCF has two operation modes. One is enhanced distributed channel access (EDCA) based on contention, and another is HCF controlled channel access (HCCA) using a contention free channel access method based on a polling mechanism.

EDCA and HCCA are controlled by a hybrid coordinator (HC) located at a base station and are compatible with legacy 802.11 MAC using DCF and PCF. The EDCA provides a prioritized traffic similar to DiffServ of a wired network to support QoS, whereas the HCCA provides a parameterized traffic similar to IntServ of a wired network to guarantee QoS.

The EDCA method is used to support prioritized QoS in infrastructure mode and ad-hoc mode. That is, the EDCA provides a differentiated channel access function for frames that are granted with different priorities by an upper layer, whereas the HCCA provides parameterized QoS in infrastructure mode.

802.11e MAC establishes a virtual connection called as a traffic stream between two stations (terminals, hereinafter referred to as 'STA') before transmitting data in order to provide parameterized QoS. Characteristics of data that are actually transmitted and parameters that request QoS are subjected to negotiating and bartering operations in the process of establishing the traffic stream. The base station allocates a wireless bandwidth to each STA based on the bartered QoS parameters and schedules frame transmission to transmit polling frames, downlink frames and the like.

TXOP of 802.11e MAC is used to assign and guarantee a predetermined time period in which frames can be transmitted to a specific STA. A TXOP can be obtained by winning EDCA contention or by receiving a QoS CF-Poll frame from the AP. The former is called EDCA TXOP and the latter is called polled TXOP.

In this manner, using the TXOP, a predetermined time period is assigned so that a certain STA can transmit frames, or a transmission time period can be forcibly limited. A transmission starting time and a maximum transmission time period are determined by the base station, which are notified to the STA through a beacon frame in the case of the EDCA TXOP or through a QoS CF-Poll frame in the case of the polled TXOP.

EDCA is used only in a contention period, whereas HCCA can be operated in both a contention period and a contention free period. However, HCCA is preferably used only in a contention period.

Hereinafter, an EDCA method will be first described.

As described above, the EDCA, i.e. a contention-based channel access method, reinforces existing DCF to permit differentiated medium access for those frames with eight classes of user priorities. Table 1 shown below summarizes user priorities. Each frame arriving at the MAC layer from an upper layer has a specific user priority value, and the user priority value is loaded on the MAC header of each QoS data frame.

TABLE 1

Table of user priority to access category mappings

| User priority | 802.1D Designation | AC (Access category) | Designation |
|---|---|---|---|
| 1 | BK | AC_BK | Back Ground |
| 2 | — | AC_BK | Back Ground |
| 0 | BE | AC_BE | Best Effort |
| 3 | EE | AC_BE | Best Effort |
| 4 | CL | AC_VI | Video |
| 5 | VI | AC_VI | Video |
| 6 | VO | AC_VO | Voice |
| 7 | NC | AC_VO | Voice |

For the transmission of QoS data frames containing those user priorities, an 802.11e QoS STA implements four access categories (AC) (refer to Table 1). The user priority of a frame arriving at the MAC layer is assigned to a corresponding AC. User priorities shown in Table 1 are specified in the IEEE 802.11D bridge standard. Every AC has a transmission queue and an AC parameter, and difference of priorities between the ACs is implemented from AC parameters that are set differently from each other, Basically, in the contention for transmission of frames which belong to the ACs, EDCA uses AIFS[AC], CWmin[AC] and CWmax[AC] instead of DIFS, CWmin and CWmax which are used by DCF. The AIFS[AC] is determined by a SIFS+AIFS[AC] slot time, in which AIFS [AC] is an integer greater than 0.

The backoff procedure of EDCA for creating a new backoff counter when collision occurs between STAs while transmitting frames is similar to that of existing DCF. A persistence factor (PF) which is differently assigned to each AC is added to EDCA. If a PF value is 2, the size of a contention window (CW) exponentially increases in the same manner as DCF.

As shown in FIG. 1, the channel access method of EDCA is similar to that of DCF. However, arbitration inter frame space (AIFS) and CW that are different in each AC are maintained. Here, the AIFS should be a value greater than the PIFS and the DIFS to protect the transmission of ACK frames or the like by setting the value greater than at least a SIFS time period.

Values of AIFS[AC], CWmin[AC], CWmax[AC] and the like that are called an EDCA parameter set can be loaded on a beacon frame by the AP and then notified to each STA. Basically, the smaller the values of the AIFS[AC] and CWmin [AC] are, the higher priority an STA has. Accordingly, channel access delay is shortened, and thus, a further wider bandwidth can be used in a given traffic environment.

The EDCA parameters are important means used to differentiate channel accesses of a variety of user prioritized traffics. In addition, if values of the EDCA parameters containing parameters of each AC are appropriately set, network performance can be optimized and an effect of transmitting traffics according to priority can be obtained. Accordingly, to guarantee fair medium access to all participating STAs in the network, the base station is required to perform overall management and control of the EDCA parameters.

As shown in FIG. 2, each of the four AC transmission queues defined in 802.11e MAC functions as an individual EDCA contention entity to access a wireless medium within an STA. Each AC has a unique AIFS value and maintains an independent backoff counter. If one or more ACs complete a backoff procedure at the same time, the virtual collision handler coordinates collisions between the ACs. A frame with the highest priority is first selected and then transmitted to contend with other STAs, and the other ACs update the backoff counter by incrementing the CW value.

As described above, 802.11e determines a transmission time period based on a TXOP when a specific STA starts transmission. The 802.11e base station loads EDCA parameters such as AIFS[AC], CWmin[AC] and CWmax[AC], and a TXOP Limit [AC] such as an EDCA TXOP time period on a beacon frame and then transfers the beacon frame to each STA.

As shown in FIG. 3, during an EDCA TXOP Limit time period, a plurality of frames with a SIFS time gap between an ACK and a subsequent frame can be simultaneously transmitted. Transmitting a plurality of frames simultaneously as such is called 'EDCA TXOP bursting'.

During the EDCA TXOP Limit time period, two QoS data frames containing a priority are transmitted. At this time, it is understood that the two QoS data frames and two ACK frames are transmitted within the TXOP Limit time period determined by the AP. Since EDCA TXOP bursting always keeps the TXOP Limit when a plurality of frames are transmitted, overall network performance is not affected by the EDCA TXOP bursting. Therefore, selecting an appropriate TXOP Limit value can enhance overall network performance.

Hereinafter, the HCCA method will be described in detail.

In order to guarantee QoS in a wireless LAN, IEEE 802.11e proposes the HCCA protocol which uses a contention free channel access method based on a polling mechanism.

The EDCA protocol is prioritized QoS which supports differentiated channel connections according to traffics of eight user priorities, whereas a HCCA protocol of a HCF contention free channel access method supports parameterized QoS based on a contract between the AP and an STA.

The HCCA protocol uses a hybrid coordinator (HC) located at the AP for centralized management of wireless medium access. Since the HC centrally and collectively manages the wireless medium, contention between STAs for the wireless medium is reduced and thus efficiency of the network is enhanced. Under the control of HC, a quite short and regular transmission delay time can be maintained when exchanging frames.

Accordingly, contrary to the CW of the EDCA protocol, the HC does not increase inter-frame transmission delay time even though traffic on the network is increased. In addition, except the STAs which are not controlled by the same HC but use the same frequency bandwidth, collisions between transmission frames hardly occurs. The reason is that QoS parameters are applied and the transmission delay and scheduling are strictly controlled. The QoS parameters are individually customized by an application service for a specific QoS traffic to support parameterized QoS.

In the HCCA, before starting to transmit certain frames that require parameterized QoS, a virtual connection called as a traffic stream (TS) is preferentially set. The traffic stream can be applied to any one of an STA-to-AP uplink, AP-to-STA downlink and STA-to-STA direct link. In order to set a traffic stream between the AP and a STA, traffic characteristics such as a frame size and average transmission speed, and QoS request parameters such as a delay time are exchanged through a negotiation process. In addition, the HC implements a call control algorithm to make a final decision whether to accept a specific traffic stream into a basic service set (BSS).

When the HC transmits a QoS CF-Poll frame to the STA, a QoS control field contains a TXOP limit value which defines TXOP. The TXOP is a service providing time period granted to the relevant STA. That is, the HC controls allocation of medium access time period using the TXOP The TXOP limit value, which is one of important QoS parameters of HCCA, is determined by TSPEC. The TSPEC is requested by the STA, and the base station can accept or deny the request for TSPEC depending on network conditions.

As described above, STA state information is included in the TSPEC which determines the TXOP for QoS, and a data transmission priority is determined using the terminal state information.

A structure of TSPEC according to a preferred embodiment of the present invention is shown in FIG. 4. As shown in the figure, the TSPEC of the present invention includes elements such as element identification (ID), length, TS info, nominal MSDU size, maximum MSDU size, minimum service interval, maximum service interval, inactivity interval, suspension interval, service start time, minimum data rate, mean data rate, peak data rate, burst size, delay bound minimum PHY rate, surplus bandwidth allowance, and medium time.

Here, the elements such as minimum service interval, maximum service interval, inactivity interval and suspension interval define a schedule interval, whereas the elements such as minimum data rate, mean data rate, peak data rate and burst size define information on an amount of data transmitted at once.

Meanwhile, the TS info element includes basic information on TS, which contains a traffic type, TSID, direction, access policy, aggregation, APSD, user priority, TS info ACK policy, schedule, reserved and terminal state area, as shown in the figure.

At this time, an area added according to the present invention is a terminal state area where state information of an STA is stored. State information stored in the terminal state area is preferably categorized into groups and then stored.

The terminal state information can have a variety of information on an STA. However, the remaining battery capacity information, CPU load information, and temperature information of the STA will be described herein by way of example.

First, the remaining battery capacity information will be discussed. The battery information can be categorized into four groups each of which can be identified by 2-bit data. (Of course, although the battery information can be stored after being broken down into further detailed groups, it is categorized into four groups considering an amount of terminal state information data.)

For example, as shown in Table 2 below, the remaining battery capacity is categorized as a first group and expressed as '11' if it is less than 30%, the capacity is categorized as a second group and expressed as '10' if it is greater than or equal to 30% and less than 50%, the capacity is categorized as a third group and expressed as '01' if it is greater than or equal to 50% and less than 75%, and the capacity is categorized as a fourth group and expressed as '00' if it is greater than or equal to 75%.

TABLE 2

| Remaining battery capacity (%) | Group | Data expression |
|---|---|---|
| Less than 30 | 1 | 11 |
| Greater than or equal to 30 and less than 50 | 2 | 10 |
| Greater than or equal to 50 and less than 75 | 3 | 01 |
| Greater than or equal to 75 | 4 | 00 |

Next, the CPU load information will be discussed. As shown in Table 3 below, the CPU load is categorized as a first group and expressed as '11' if it is greater than or equal to 75%, the load is categorized as a second group and expressed as '10' if it is greater than or equal to 50% and less than 75%, the load is categorized as a third group and expressed as '01' if it is greater than or equal to 30% and less than 50%, and the load is categorized as a fourth group and expressed as '00' if it is less than 30%.

TABLE 3

| CPU load (%) | Group | Data expression |
|---|---|---|
| Greater than or equal to 75 | 1 | 11 |
| Greater than or equal to 50 and less than 75 | 2 | 10 |
| Greater than or equal to 30 and less than 50 | 3 | 01 |
| Less than 30 | 4 | 00 |

Next, the temperature information will be discussed. As shown in Table 4 below, the temperature is categorized as a first group and expressed as '11' if it cannot be measured, the temperature is categorized as a second group and expressed as '10' if it is extremely high, the temperature is categorized as a third group and expressed as '01' if it is slightly high, and the temperature is categorized as a fourth group and expressed as '00', if it is appropriate.

TABLE 4

| Temperature | Group | Data expression |
|---|---|---|
| Impossible to measure | 1 | 11 |
| Extremely high | 2 | 10 |
| Slightly high | 3 | 01 |
| Appropriate | 4 | 00 |

At this time, since the criterion of temperature for determining an appropriate or high temperature varies according to types and characteristics of terminals, it is preferable to set the temperatures depending on the characteristics of terminals.

Of course, displaying the state information as described above is only an example. In the present invention, it is essential to contain state information of an STA into TSPEC and use the state information for data transmission scheduling. Accordingly, the terminal state information may be included in the TS info or in another area of the TSPEC.

Meanwhile, as shown in FIG. 5, the TSPEC is included in an ADDTS.request frame that is constructed by a non-QAP STA and transmitted to the AP (HC) by a non-AP QSTA MAC.

Next, the AP (HC) reflects the transmitted TSPEC when scheduling TS and sets the TS by transmitting an ADDTS.response frame to the non-QAO STA. The ADDTS.response frame contains the TSPEC onto which the scheduled TS is reflected.

At this time, the TS scheduling is determining service intervals (minimum service interval, maximum service interval, inactivity interval and suspension interval) and data rates (minimum data rate, mean data rate, peak data rate and burst size) using the terminal state.

That is, the TS is scheduled in such a manner that as the remaining battery capacity decreases and the CPU load and temperature increase, the service intervals become longer and the data rates become lower, so that battery consumption and CPU load can be reduced. Further, as the remaining battery capacity increases and the CPU load and temperature decrease, the service intervals become shorter and the data rates become higher, so that data transmission efficiency can be enhanced.

The aforementioned terminal state information has a structure as shown in FIG. 6.

As shown in the figure, the remaining battery capacity information, CPU load information, and temperature information are respectively 2-bit long, and an extra storage space is reserved.

If the traffic stream (TS) is set once, the HC allocates a wireless bandwidth required for the set traffic stream between the AP and an STA, thereby trying to provide contracted QoS. In a contention free period of HCCA, the HC has an overall control over the medium. If necessary, even in a contention period, the medium can be accessed by transmitting a QoS CF-Poll frame after an idle time as long as a PIFS. That is, even in a contention period, a QoS CF-Poll frame is transmitted to assign a polled TXOP, and a right to control the medium is thus obtained. Therefore, a periodically repeated HCF super frame includes both a contention free period and a contention period (refer to FIG. 7).

Furthermore, the terminal state information is a value varying with time, and the varying terminal state information should be transmitted to the AP.

To continuously transfer the terminal state information to the AP, a DATA frame is used in the present invention.

That is, a terminal state information area is added to a DATA frame transferred from a STA to the AP, and thus, a DATA frame containing the terminal state information is transferred to the AP.

To this end, a DATA frame according to the present invention has a structure shown in FIG. 6. That is, as shown in the figure, the terminal state information is contained in the DATA frame header including a frame control, duration identification (ID), address 1, address 2, address 3, sequence control, address 4, and QoS control.

At this time, the terminal state information has a structure shown in FIG. 6 as described above.

Meanwhile, if it is determined from the terminal state information received through the DATA frame that the set TS needs to be updated, the base station sets new TS.

At this time, a variety of method can be used to set the new TS, but the following two methods will be described by way of example.

The first one is a method of deleting existing TS and setting new TS. To this end, the base station notifies through a DELTS.request frame that the existing TS has been deleted.

Then, the new TS is set through an ADDTS.request frame. As described above, setting the new TS is informed to the terminal through the ADDTS.request frame onto a new TSPEC has been reflected, and the terminal which has received the ADDTS.request frame transmits the ADDTS.response frame to the base station and thus the new TS is set.

The second one is a method of updating existing TS to TS, onto which a new TSPEC has been reflected, through a schedule frame without deleting an existing TSPEC. To this end, the schedule frame is transmitted. At this time, the schedule frame is included in a QoS action frame.

To this end, the schedule frame has a structure containing a TSPEC which includes terminal state information contained in a newly transmitted DATA frame. That is, as shown in FIG. 9, a QoS action frame contains a schedule frame which in turn contains a TSPEC. As described above, the TSPEC contains the terminal state information.

Meanwhile, as shown in FIG. 10, a polled STA receives a QoS CF-Poll frame. As a result, the polled STA obtains a right to access a channel during a time period equal to a TXOP Limit value defined in the QoS CF-Poll frame and transmits a plurality of frames. At this time, other STAs receive the QoS CF-Poll frame although the frame has nothing to do with them, and then set a network allocation vector (NAV) of their own by adding the TXOP time period and a predetermined time period, during which the STAs do not contend for the channel access.

Ultimately, the HC needs to appropriately schedule the transmission of QoS CF-Poll frames to satisfy contracted QoS requirements. Since channel conditions of the wireless medium are diverse according to time and space, creating an efficient scheduling algorithm is one of important elements in supporting QoS. A quite excellent scheduling algorithm does not breach a QoS contract and allows further more traffic streams, so that wireless network performance can be enhanced.

Hereinafter, a wireless communication system and method for providing a traffic stream according to the present invention will be described by referring to the method of setting TS.

FIG. 11 is a flowchart illustrating a method of setting and re-setting TS according to a preferred embodiment of the present invention.

As shown in the figure, to allow the AP to set the TS according to a preferred embodiment of the present invention, an STA first creates a TSPEC containing its own state information (S100). At this time, as described above, the terminal state information is included in the TS info area of the TSPEC and is divided and stored in 2-bit data.

After creating the TSPEC, the STA transmits the TSPEC to the base station (S110). At this time, the TSPEC is contained in an ADDTS.request frame which requests to set the TS.

The base station which has received the ADDTS.request frame schedules the TS using the terminal state information contained in the ADDTS.request frame (S120). At this time, the TS is scheduled by setting TXOP, which specifies a data transmission time period, in consideration of the terminal state information.

As previously described above, the TXOP is set in such a manner that as the remaining battery capacity increases and the CPU load and temperature decrease, the service interval becomes shorter and the data transmission rate becomes higher.

If the TS is scheduled, the base station transmits scheduling results to the STA through an ADDTS.response frame (S130) and then sets the TS between the AP and the STA (S140).

Next, the base station transmits data to the STA according to the set TS (S150).

Meanwhile, the terminal state information is a time-varying parameter. That is, since the remaining battery capacity, CPU load, and temperature of a terminal are time-varying values, the changing terminal state information should be transmitted to the base station to update the TS in accordance with the changed terminal state information.

To this end, the STA constructs a DATA frame containing a TSPEC which includes the changed terminal state information (S160). At this time, the structure of the DATA frame containing the TSPEC has been already described.

If the DATA frame has been constructed, the STA transmits the DATA frame to the base station (S170).

At this time, the DATA frame containing the terminal state information may be constructed and transmitted either periodically or only when the terminal state information is changed.

Meanwhile, the base station which has received the DATA frame checks the terminal state information contained in the DATA frame and then determines whether the TS needs to be updated (S180).

At this time, whether to update the TS is determined by comparing the TXOP value, onto which a new terminal state has been reflected, with the existing TXOP value and determining whether any change occurs.

If it is determined that the TS does not need to be updated, the existing TS should be maintained (S190). If it is determined that the TS needs to be updated, the base station deletes the existing TS (S200 and S210). As shown in FIG. 13, when deleting the TS, the base station transmits a DELTS.request frame (S200 and S210) to notify that the TS has been deleted.

Next, the terminal transmits an ADDTS.request frame containing a new TSPEC (S220), and then the base station which has received the ADDTS.request frame (S230) transmits an ADDTS.response frame (8240) so that new TS can be set using the ADDTS.response frame (S250).

Next, the base station transmits data through the TS that has been updated as described above (S260).

Furthermore, FIG. 12 is a flowchart illustrating a method of setting and re-setting TS according to another preferred embodiment of the present invention.

As shown in the figure, a method of initially setting TS and transmitting data frames according to this embodiment of the present invention is the same as that according to the previous embodiment of the present invention. However, they are different from each other in view of a method of re-setting the TS when it is determined that TS needs to be updated. That is, steps S100 to S190 of this embodiment are the same as those of the previous embodiment.

According to another embodiment of the present invention, if it is determined that it is necessary to re-set the TS, the base station transmits a schedule frame to the terminal (S200'). At this time, the schedule frame contains a TSPEC.

The terminal which has received the schedule frame (S210') updates the TS using the TSPEC contained in the schedule frame (S220').

At the same time, the base station which has transmitted the schedule frame also updates the TS (S220') and transmits data to the terminal through the updated TS (S230').

The following advantages can be expected from a wireless communication system, a terminal device and a base station for the wireless communication system, and a method of providing a traffic stream according to the present invention described above in detail.

That is, since a TXOP is set using state information of a terminal device to schedule data transmission, there is an advantage in that optimal scheduling considering a state of a receiving side can be performed when transmitting data.

Further, since the terminal state information is continuously transmitted to the AP, and the base station updates a traffic stream according to the updated terminal state information, there is another advantage in that optimal traffic stream can be maintained.

Furthermore, since the traffic stream in which a terminal state is considered is set, there is a further advantage in that an excessive operation of a terminal can be avoided and thus power consumption of the terminal device can also be reduced.

Meanwhile, although the present invention has been described and illustrated in connection with the preferred embodiments, it will be readily understood by those skilled in the art that various modifications and changes can be made thereto without departing from the spirit and scope of the present invention defined by the appended claims.

What is claimed is:

1. A wireless communication system, comprising:
    a base station for setting a data transmission mode using terminal state information; and
    a terminal device connected to the base station and configured to transmit the terminal state information representing a state thereof to the base station,
    wherein the terminal state information includes any one or more of remaining battery capacity information, central processing unit (CPU) load information, and temperature information of the terminal device, and
    wherein the base station sets the data transmission mode according to the terminal state information in such a manner that as the remaining battery capacity increases and the CPU load and temperature decrease, a service interval becomes shorter and a data transmission rate becomes higher.

2. The system as claimed in claim 1, wherein each of the remaining battery capacity information, the CPU load information and the temperature information is divided into four groups each of which is expressed as 2-bit data.

3. The system as claimed in claim 1, wherein the data transmission mode is set by differently setting a data transmission time period according to the terminal state information.

4. The system as claimed in claim 1, wherein the terminal device repeatedly transmits the time-varying terminal state information to the base station in a periodic or non-periodic manner, and
    wherein terminal state information is contained in a DATA frame header including a frame control, duration identification, address 1, address 2, address 3, sequence control, address 4, and QoS control.

5. The system as claimed in claim 4, wherein if it is determined from the received terminal state information that the data transmission mode needs to be re-set, the base station deletes existing data transmission mode and transmits data in data transmission mode re-set based on the received terminal state information.

6. A wireless communication system, comprising:
    a base station for controlling a wireless communication; and
    a terminal device connected to the base station to transmit and receive data,
    wherein the terminal device updates terminal state information representing a state thereof in a periodic or non-periodic manner and transmits the updated terminal state information to the base station, and the base station updates a data transmission schedule using the transmitted terminal state information and transmits data according to the updated schedule,
    wherein the terminal state information includes any one or more of remaining battery capacity information, central processing unit (CPU) load information, and temperature information of the terminal device and wherein the base station sets the data transmission mode according to the terminal state information in such a manner that as the remaining battery capacity increases and the CPU load and temperature decrease, a service interval becomes shorter and a data transmission rate becomes higher.

7. A wireless communication terminal device, wherein the terminal device is configured to transmit state information of the terminal device to a base station and receive data according to data transmission mode scheduled by the base station,
wherein the terminal state information includes any one or more of remaining battery capacity information, central processing unit (CPU) load information, and temperature information of the terminal device and wherein the base station sets the data transmission mode according to the terminal state information in such a manner that as the remaining battery capacity increases and the CPU load and temperature decrease, a service interval becomes shorter and a data transmission rate becomes higher.

8. The terminal device as claimed in claim 7, wherein the terminal device repeatedly transmits the time-varying terminal state information to the base station in a periodic or non-periodic manner.

9. A wireless communication base station, wherein the base station is configured to receive terminal state information transmitted from a terminal device, set data transmission mode using the terminal state information and transmit or receive data according to the set data transmission mode;
wherein the terminal state information includes any one or more of remaining battery capacity information, central processing unit (CPU) load information, and temperature information of the terminal device, and
wherein the base station sets the data transmission mode according to the terminal state information in such a manner that as the remaining battery capacity increases and the CPU load and temperature decrease, a service interval becomes shorter and a data transmission rate becomes higher.

10. The base station as claimed in claim 9, wherein the data transmission mode is set by differently setting a data transmission time period according to the terminal state information.

11. The base station as claimed in any one of claims 9 and 10, wherein if it is determined from the received terminal state information that the data transmission mode needs to be re-set, the base station deletes existing data transmission mode and transmits data in data transmission mode re-set based on the received terminal state information.

12. A method of scheduling channels of a wireless communication system, the method comprising the steps of:
transmitting, by a terminal, terminal state information thereof to a base station;
setting or updating, by the base station, channel scheduling mode according to the terminal state information and then transmitting the set or updated channel scheduling mode to the terminal; and
transmitting and receiving data according to the set or updated channel scheduling mode;
wherein the terminal state information includes any one or more of remaining battery capacity information representing remaining battery capacity, central processing unit (CPU) load information representing CPU load of the terminal, and temperature information representing temperature of the terminal, and
wherein the base station sets the data transmission mode according to the transmitted terminal state information in such a manner that as the remaining battery capacity increases and the CPU load and temperature decrease, a service interval becomes shorter and a data transmission rate becomes higher.

13. The method as claimed in claim 12, further comprising the steps of:
transmitting, by the terminal, a channel scheduling request message to the base station; and transmitting, by the base station, a response message to the terminal in response to the channel scheduling request message.

14. The method as claimed in claim 13, wherein the step of transmitting the terminal state information to the base station comprises the steps of:
transmitting, by the base station, a request message requesting the terminal state information to the terminal; and
transmitting, by the terminal, the terminal state information to the base station in response to the request message.

15. The method as claimed in claim 12, further comprising the step of:
if the channel scheduling mode is updated, deleting existing channel scheduling mode.

16. The method as claimed in claim 12, further comprising the step of:
constructing a DATA frame containing a traffic specification;
transmitting the DATA frame to the base station;
checking the terminal state information contained in the received traffic specification and then determining whether it is necessary to set a new channel schedule; and
if it is determined that it is necessary to re-set the new channel schedule, updating a channel schedule in consideration of the received traffic specification and then setting the new channel schedule by transmitting the updated channel schedule to the terminal device.

17. The method as claimed in claim 16, wherein a header area of the DATA frame has a terminal state information area for storing the terminal state information.

18. The method as claimed in claim 12, further comprising the steps of:
constructing a terminal state information frame containing a traffic specification;
transmitting the terminal state information frame to the base station;
determining, according to the received terminal state information frame, whether it is necessary to set a new channel schedule; and
if it is determined that it is necessary to set the new channel schedule, updating a channel schedule in consideration of the received traffic specification and then setting the new channel schedule by transmitting the updated channel schedule to the terminal device.

19. The method as claimed in claim 18, wherein the base station transmits a terminal state request frame to receive the terminal state information, and the terminal device transmits a terminal state response frame to the base station in response to the terminal state request frame to transmit the terminal state information.

20. The method as claimed in any one of claims 16 to 19, wherein the channel scheduling mode is updated by transmitting a schedule frame containing new traffic specification information to the terminal.

21. The method as claimed in any one of claims 16 to 19, wherein the channel scheduling mode is updated by the steps of:
transmitting a delete request frame to the terminal to inform that existing traffic specification information has been deleted;
transmitting a channel scheduling request frame containing new traffic specification information to the base station; and transmitting scheduling results, onto which the new traffic specification information is reflected, to the terminal device using a response message.

22. A method of scheduling channels of a wireless communication terminal, the method comprising the steps of:
   transmitting a channel scheduling request message;
   receiving a response message to a channel scheduling request;
   transmitting terminal state information including at least one of remaining battery capacity information representing remaining battery capacity, central processing unit (CPU) load information representing CPU load of the terminal, and temperature information representing temperature of the terminal to a base station periodically or in response to a request of the base station;
   receiving channel scheduling mode updated by the base station according to the terminal state information;
   receiving data according to the updated channel scheduling mode and wherein the base station sets the data transmission mode according to the terminal state information in such a manner that as the remaining battery capacity increases and the CPU load and temperature decrease, a service interval becomes shorter and a data transmission rate becomes higher.

* * * * *